Feb. 23, 1937. E. AGHNIDES 2,071,780
CONNECTER FOR TAPS, PIPES, AND THE LIKE
Filed May 25, 1935 2 Sheets-Sheet 1
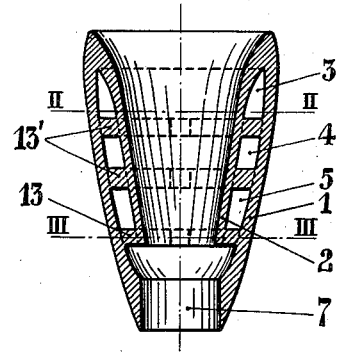
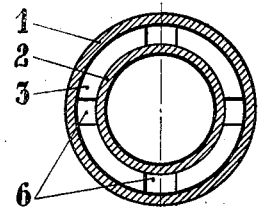
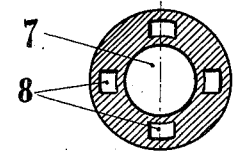
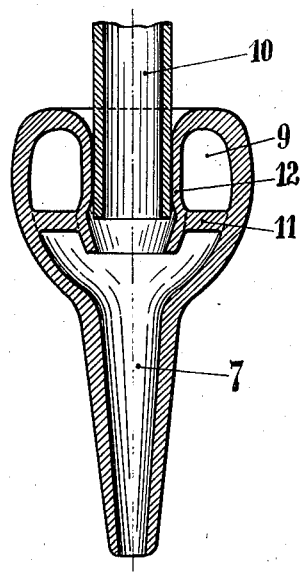
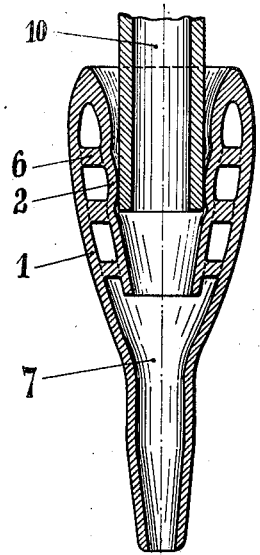
Inventor:
Elie Aghnides
Attorney:

Feb. 23, 1937. E. AGHNIDES 2,071,780
CONNECTER FOR TAPS, PIPES, AND THE LIKE
Filed May 25, 1935 2 Sheets-Sheet 2
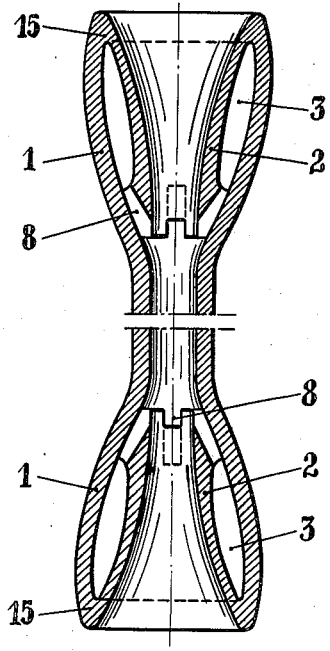
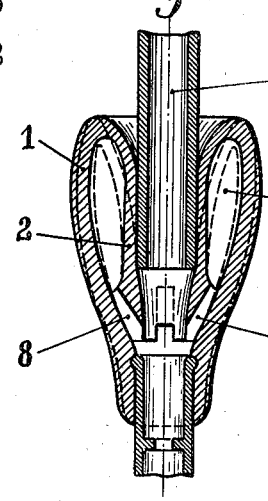
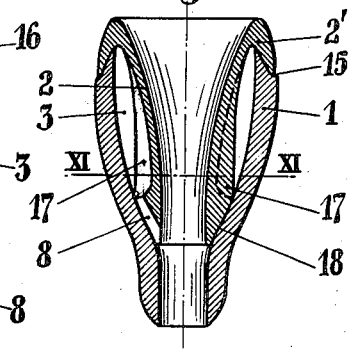
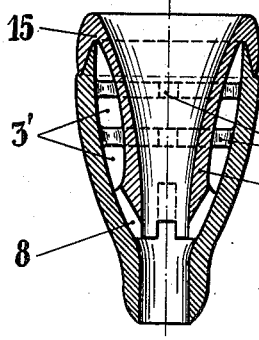
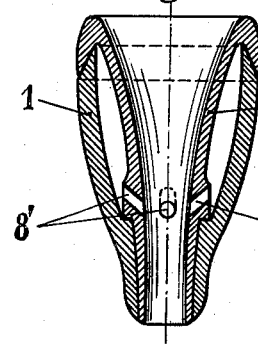
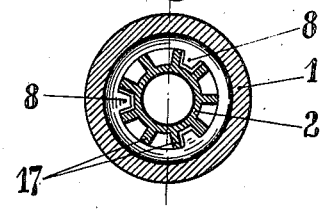
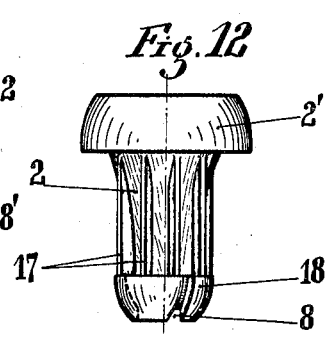
Inventor:
Elie Aghnides
Attorney:

Patented Feb. 23, 1937

2,071,780

UNITED STATES PATENT OFFICE 2,071,780

CONNECTER FOR TAPS, PIPES, AND THE LIKE

Elie Aghnides, Brussels, Belgium

Application May 25, 1935, Serial No. 23,499
In Belgium June 4, 1934

6 Claims. (Cl. 285—90)

REISSUED

The present invention relates to pneumatic connecters adapted to connect two sections of fluid pipes under pressure or to be applied to the outlet nozzle of a tap or any other fitting. The connecters of this type are provided with an internal fold of their wall for forming around the pipe on which the connecter is fitted an annular space or chamber into which the fluid under pressure penetrates and acts for tightening the inturned part of the wall against the pipe. In these known connecters, the inturned wall in the interior for a pneumatic pressure chamber is of decreasing thickness and moreover, its inner end being free relatively to the outer wall of the connecter, it is impossible to apply them to pipes, fittings or taps of variable shapes and dimensions. On the other hand these connecters are detached from pipes or fittings to which they are applied when the pressure of the fluid which passes through them exceeds a relatively low limit.

The invention has for its object to remedy these disadvantages and in particular to create a connecter which adaptes itself automatically to pipes of any dimensions and shapes, comprised within relatively wide limits, and to ensure a rigid maintenance and fluid tightness of the connecter under all pressures of the range, whether the connected pipes are rigid, flexible, stationary or movable.

Essentially these results are obtained by a connecter wherein the inturned wall in the interior thereof is extended in the interior of the connecter so as to form a relatively long chamber, the inturned part being fixed, at one or more points, to the outer wall which surrounds it and wherein the internal longitudinal section along the whole length of the inturned portion decreases from the opening (truncated cone, with a straight, curved or stepped generating line). When the inturned wall (inturned part) is connected to the outer wall solely at its end, the connecter is then only provided with a single annular pneumatic chamber; when this internal wall is also connected to the outer wall at a number of intermediate points, the annular chamber is divided into a number of successive communicating chambers.

Such as it is, the connecter may meanwhile, in certain cases, still leave room for improvement.

The internal wall of the chamber is deformed under the pressure of the fluid so as to apply itself to the wall of the pipe introduced into the connecter; this wall, initially truncated, therefore becomes cylindrical, when the pipe or fitting introduced is cylindrical. It thus results in the part of the wall of the chamber not in contact with the pipe, a deformation, which is not only useless, but deleterious, which is converted into a lengthening of the part situated between the terminal edge of the pipe and the end provided with the inlet orifice or orifices for the fluid into the annular chamber, which, in certain cases, entrains the detachment of the connecter.

Moreover the deformation produced by the pressure determines a tightening around the pipe which is at the maximum at the end of the pipe and which is reduced towards the part of largest diameter of the connecter in such a manner that the effect of the pneumatic tightening is not distributed suitably over the whole part of the pipe introduced into the connecter, as is the case, for example, with a cylindrical connecter.

The invention provides, for remedying this, for imparting to the inner wall of the chamber a uniform or preferably an increasing thickness from the inlet so as to meet the maximum thickness at the point of which this inner wall is connected to the outer wall, precisely where there are provided the openings for the admission of fluid into the said chamber. There is thus ensured, along the whole length of the internal wall, a variable resistance to deformation with, as a result, a greater solidity of the wall and a better adherence of the latter along the whole length of the pipe. This wall of increasing or constant thickness may be applied in the case of chambers in succession. On the other hand there is provided a reinforcing means for the wall at the portion provided with an opening or openings for the admission of fluid into the annular chamber.

In another modified form of construction the inner wall of increasing thickness is provided on the face in question with longitudinal grooves of which the depth increases in such a manner as to leave the wall decreases in such a manner as to leave at the bottom of these grooves a substantially uniform thickness of wall over the whole length of the wall. In fact the increase in thickness previously provided is only obtained along longitudinal bands, preferably spaced uniformly over the entire periphery of the wall and separated by substantially constant thin bands where the wall is very thin.

In this manner the inner wall of the connecter remains extensible transversely (by reason of the bands of small thickness between the ribs) and is practically inextensible in the direction of its length. With this are associated important advantages. The inner wall is very thin at the portion thereof which resists transverse extension. As a result the insertion of the end of a pipe or tap into the connecter is much easier and consequently this end can be inserted more deeply into the connecter. Moreover by reason of the slight thickness the transmission of the pressure of the fluid is more complete as the inner wall can be deformed transversely. Also there is effectively prevented any extension of the portion of the inner wall between the end edge of the pipe or tap and the inlet orifices for the fluid into the pneumatic chamber or chambers. From the point of view of the facility of fitting the connecter and inserting the end of the tap into this it is possible, without in any way reducing the security, to make the inner wall, in its thin bands included between the projecting ribs, of a thickness which decreases with the internal diameter of the connecter.

The accompanying drawings show by way of example, which are not limiting, various forms of construction. In these drawings:

Fig. 1 is an axial section of a connecter with a number of successive chambers.

Fig. 2 is a cross section on II—II of Fig. 1.

Fig. 3 is a cross section on III—III of Fig. 1.

Fig. 4 is an axial section of a connecter with a single annular chamber.

Fig. 5 is a similar view of a connecter with a number of chambers mounted on a fitting or a tap.

Fig. 6 is an axial section of a double connecter with a single annular chamber of which the internal wall is of non uniform thickness.

Fig. 7 shows the connecter of Fig. 6 mounted on a cylindrical pipe.

Fig. 8 is an axial section of a connecter with a number of successive chambers.

Fig. 9 is a modification of Fig. 6.

Fig. 10 is an axial section of a modification.

Fig. 11 is a horizontal section on the line XI—XI of Fig. 10.

Fig. 12 is a front view of the inner wall of the connecter alone.

The connecter, such as shown in Fig. 1, has a relatively thick outer wall 1 and a relatively thin inner wall 2, both being of truncated shape. Between these two walls 1 and 2 are located annular chambers 3, 4, 5 communicating with one another by holes 6 (Fig 2). The last, lower, annular chamber 5 communicates with the axial passage 7 of the connecter by holes 8 (Fig. 3). The thickness of the inner wall 2 is constant; as shown in Fig. 1, this inner wall 2 is connected to the outer wall 1 at its end at 13 and at intermediate points at 13'.

Fig. 4 shows a connecter, which only has a single annular chamber 9, mounted on a tap 10. The chamber 9 is defined by a perforated diaphragm rib or ribs, or any suitable connection 11 between the inner rim 12 and the outer wall. The pressure of fluid in the annular chamber 9 applies the inner rim 12 energetically against the tap.

Fig. 5 shows the connecter according to Fig. 1 secured to a tap 10 or any other suitable fitting. The pressure of the fluid is communicated to the annular chambers by the holes 6, 7. The thin inner wall 2 swells at the point of each annular chamber and is applied strongly against the outer surface of the tap. On the other hand the inner wall 2 being truncated, the annular chambers form successive cushions of decreasing diameter.

In the modifications of Figs. 6 to 9 the thickness of the inner wall 2 is no longer constant, for the purpose set out above. As shown in Fig. 6 the connecter, adapted to connect two stationary or free pipes, has at each end a widened part enabling pipes of different diameter and shape to be introduced. Each widened or truncated part has a double wall for forming a chamber 3. The chamber 3 is provided at its base with opening 8 for the admission of fluid under pressure which circulates in the pipes; these openings may be provided in the wall itself of the bent part and secured to the inside as in Fig. 9 at 8'. In one case or the other there is provided a compensating reinforcement of the wall weakened by the perforation or perforations.

The feature of this connecter resides therein that the inner wall 2 of the chamber has a decreasing or uniform thickness from its base up to the inner edge 15, for the purpose specified. Fig. 7 shows that with this variable thickness, the inner wall is deformed unequally along its entire height and is applied exactly and uniformly along the whole portion of the pipe engaged in the connecter. This feature, combined with that which consists in obviating any weakening of the wall at the point of the opening or openings, permits of avoiding the lengthening of the part located between the terminal edge of the pipe 16 and the end secured to the outer wall.

In the example of Fig. 8 where a number of successive chambers 3' are provided, which communicate with one another by openings 6, the inner wall 2 of the connecter is also of variable thickness; it is possible as in the drawings, to give this wall a uniform variation of thickness along its entire height without considering the walls separating the chambers, or also to apply the variation of thickness of the inner wall for each successive chamber separately. In the case of the connection with a number of communicating chambers, with equality of pressure, it is possible to adopt walls of less thickness.

In the example shown in Figs. 10 to 12, 3 is the annular pneumatic chamber formed by the outer wall 1 and the inner wall 2 of the connecter. In practice the connecter, at the point of the chamber 3, is preferably formed of an inner body 2 (Fig. 12) composed of a tube of truncated section, provided at its upper end with a rim or flange 2' which is connected at 15 to the outer body 1 of the connecter, and of a lower enlargement 18 also welded to the body 1, passages 8 being provided in this strengthening enlarged portion 18 for the passage of fluid into the chamber 5.

The inner wall 2 is relatively very thin and is of uniform thickness, or slightly increasing or decreasing in thickness with the reduction in diameter. The essential feature resides in the ribs 17 formed on the outer face of this wall, that is to say, on the face turned towards the chamber 3. These ribs or fins are arranged longitudinally over the whole length of the wall and are uniformly distributed over the entire surface. Their height, that is to say, the amount by which they project from the surface 2, increases with the reduction in diameter of the wall 2. The wall 2 is thus extensible in the transverse direction as the ribs or fins 17 only act in the longitudinal direction.

Consequently the connecter, or better the wall 2, is practically inextensible longitudinally which ensures stable securing of the connecter and, on the other hand, by reason of the transverse extensibility, the connecter can be fitted easily and deeply over the end of a pipe or tap.

It will be understood that in all the forms of construction the wall 2 may be in one piece with the outer wall 1, or be connected to this (Figs. 8 and 9); in this latter case the walls 1 and 2 may be made of different materials, only the inner wall 2 being, for example, flexible.

As will be seen from the drawings, the height of the inner wall 2 is at least equal to the littlest diameter of said wall.

Having now fully described my said invention, what I claim and desire to secure by Letters Patent, is:

1. A connecter for the purpose described formed of flexible material and including an outer wall, an inner wall spaced concentrically from the outer wall and connected thereto at the top whereby to form an annular chamber closed at its upper end and surrounding said inner wall, said outer wall extending below the inner wall to form a fluid passage, said chamber having port communication with the said passage and the passage having a constricted outlet end, and means connecting the lower end of the inner wall to the outer wall.

2. A connecter for the purpose described formed of flexible material and including an outer wall, an inner wall spaced concentrically from the outer wall and connected thereto at the top whereby to form an annular chamber closed at its upper end and surrounding said inner wall, said outer wall extending below the inner wall to form a fluid passage, and an annular flange connecting the lower end of the inner wall with the outer wall and at least partially closing said chamber, said chamber having port communication with the passage.

3. A connecter for the purpose described formed of flexible material and including an outer wall, an inner wall spaced concentrically from the outer wall and connected thereto at the top whereby to form an annular chamber closed at its upper end and surrounding said inner wall, said outer wall extending below the inner wall to form a fluid passage, and an annular flange connecting the lower end of the inner wall with the outer wall and at least partially closing said chamber, said chamber having port communication with the passage, and other annular flanges connecting the inner and outer walls above the first flange and provided with port openings.

4. A connecter for the purpose described formed of flexible material and including an outer wall, an inner wall spaced concentrically from the outer wall and connected thereto at the top whereby to form an annular chamber closed at its upper end and surrounding said inner wall, said outer wall extending below the inner wall to form a fluid passage, and an annular flange connecting the lower end of the inner wall with the outer wall and at least partially closing said chamber, said chamber having port communication with the passage, said flange extending longitudinally of the outer wall for a distance greater than the thickness of the inner wall.

5. A connecter for the purpose described formed of flexible material and including an outer wall, an inner wall spaced concentrically from the outer wall and connected thereto at the top whereby to form an annular chamber closed at its upper end and surrounding said inner wall, said outer wall extending below the inner wall to form a fluid passage, an annular flange connecting the lower end of the inner wall with the outer wall and at least partially closing said chamber, said chamber having port communication with the passage, and ribs extending longitudinally of the outer side of the inner wall from the flange to the upper end of the chamber.

6. A connecter for the purpose described formed of flexible material and including an outer wall, an inner wall spaced concentrically from the outer wall and connected thereto at the top whereby to form an annular chamber closed at its upper end and surrounding said inner wall, said outer wall extending below the inner wall to form a fluid passage, an annular flange connecting the lower end of the inner wall with the outer wall and at least partially closing said chamber, said chamber having port communication with the passage, said flange extending longitudinally of the outer wall for a distance greater than the thickness of the inner wall, and ribs extending longitudinally of the outer side of the inner wall from the flange to the upper end of the chamber.

ELIE AGHNIDES.